March 3, 1936.  H. J. MALLON  2,032,708
AIRCRAFT TRAINING AND AMUSEMENT APPARATUS
Filed May 1, 1934  3 Sheets-Sheet 1
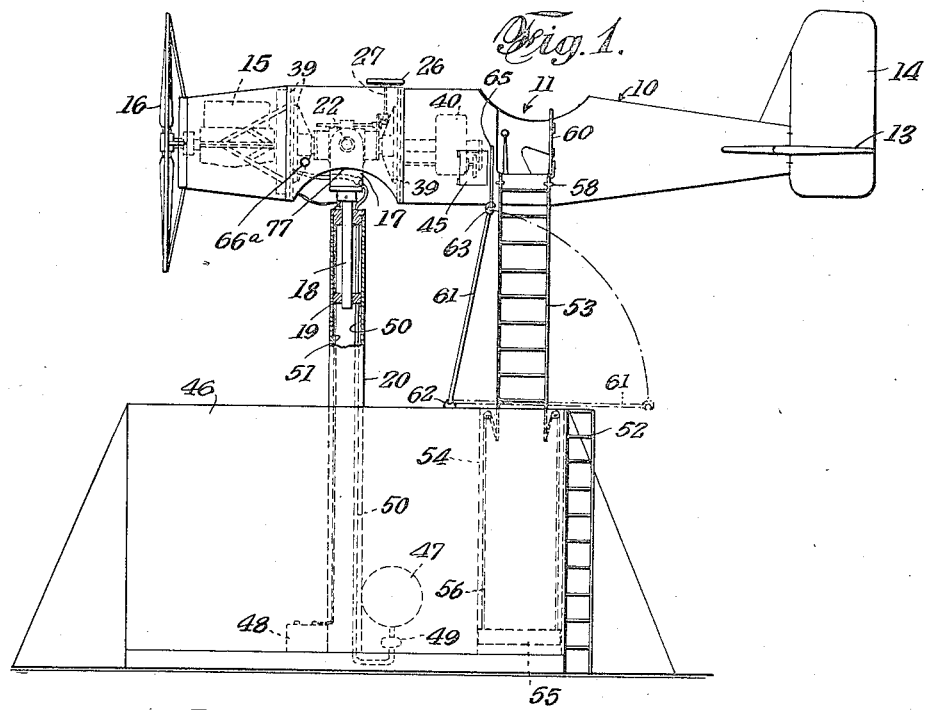
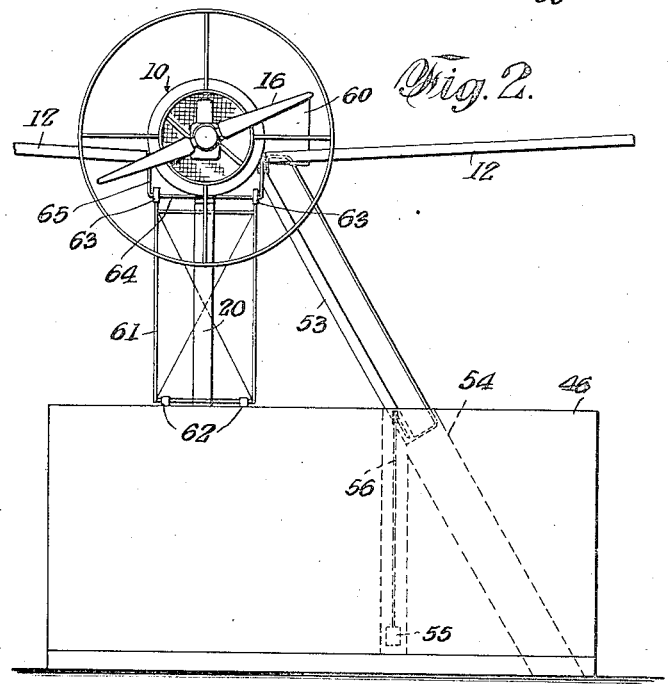
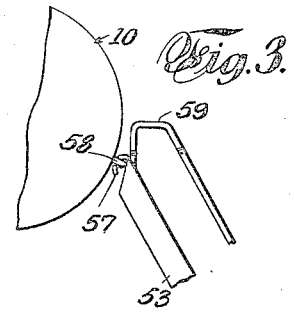
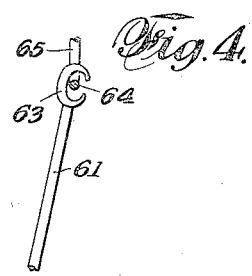
INVENTOR
HUGH J. MALLON
BY
ATTORNEY March 3, 1936.   H. J. MALLON   2,032,708
AIRCRAFT TRAINING AND AMUSEMENT APPARATUS
Filed May 1, 1934   3 Sheets-Sheet 2
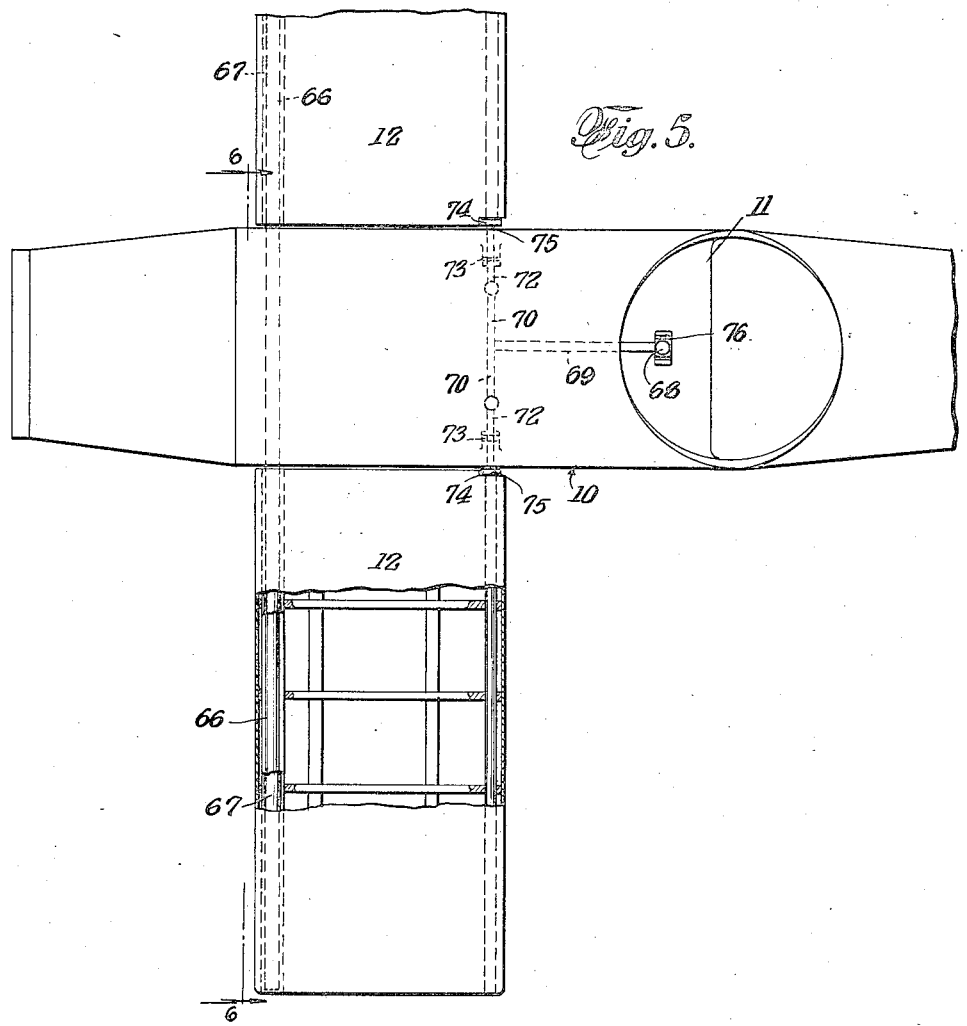
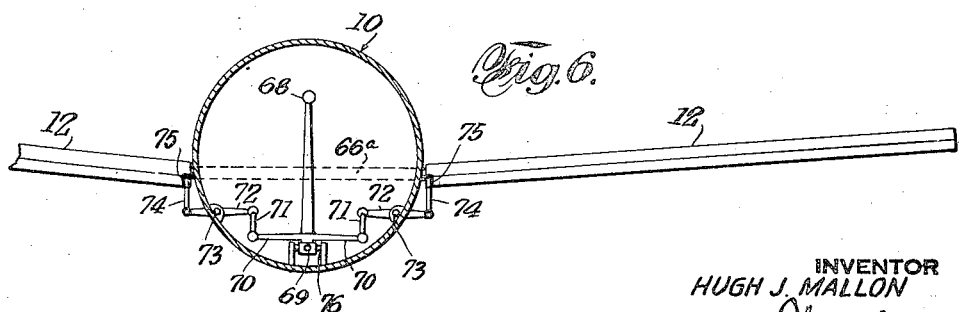
INVENTOR
HUGH J. MALLON
BY
ATTORNEY

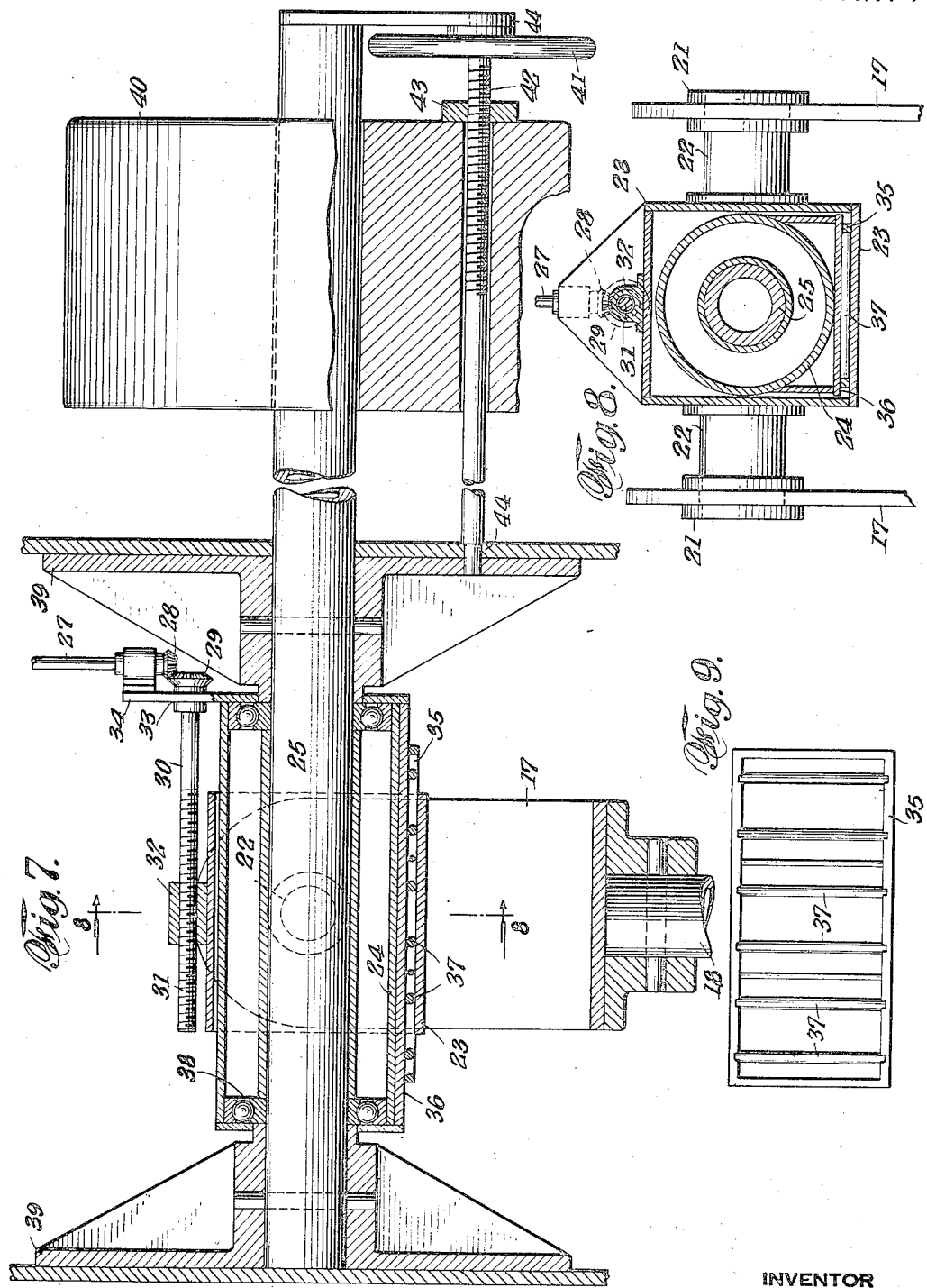

Patented Mar. 3, 1936

2,032,708

UNITED STATES PATENT OFFICE 2,032,708

AIRCRAFT TRAINING AND AMUSEMENT APPARATUS

Hugh James Mallon, New York, N. Y.

Application May 1, 1934, Serial No. 723,319

10 Claims. (Cl. 35—12)

This invention relates to apparatus for training in the handling of aircraft and the purposes of the invention are to provide such apparatus in a truly practical commercial form, which in addition to affording the desired teaching and training, will also serve for amusement purposes.

Further objects of the invention are to make the apparatus simple and sturdy, safe in the hands of those having no previous teaching, readily adjusted to different users, realistic in action and entirely practical in all respects.

The foregoing and other desirable objects are attained by the novel features of construction, combinations and relations of parts hereinafter described, illustrated in the accompanying drawings and claimed.

The drawings referred to illustrate certain definite embodiments of the invention, but as such illustration is primarily by way of disclosure, it should be understood that the structure may be modified and changed in various ways, all within the true intent and broad scope of the invention as claimed.

Fig. 1 is a side elevation of an embodiment of the invention with the near wing removed and portions of the vertical pivot mounting broken and appearing in section.

Fig. 2 is a broken front view of the apparatus.

Figs. 3 and 4 are broken details of the ladder connection and the temporary holding connection with the fuselage.

Figs. 5 and 6 are broken plan and cross-sectional details of the fuselage illustrating particularly the wing warping controls; Fig. 6 appearing as taken on line 6—6 of Fig. 5.

Fig. 7 is an enlarged broken sectional view illustrating particularly the mechanism for longitudinally shifting the fuselage for balance purposes.

Fig. 8 is a cross-sectional view of such mechanism as on substantially the plane of line 8—8 of Fig. 7.

Fig. 9 is a detail view of the cage carrying the rollers on which the longitudinally shiftable bearing box rides.

The fuselage 10 of the machine may be made to resemble as nearly as possible, an ordinary airplane with control cockpit 11, wings 12 and tail surfaces 13, 14, etc.

A special feature of the invention is the use of an internal combustion engine 15, for driving the propeller 16. This gives a more realistic effect than has heretofore been attained with the use of electric motors and avoids the heavy electrical connections required by such motors.

The engine is placed in the nose of the ship to counterbalance the weight of the passenger in the cockpit and the structure is pivotally supported intermediate these two points.

In the present illustration, the pivotal mounting consists of an upright fork or yoke 17, having a long hollow stem 18, journalled in bearings 19, in a hollow upstanding post 20, said yoke carrying in the sides of the same bearings 21, for the horizontal spindles or journals 22, of the longitudinally extending box or casing 23, which supports in longitudinally adjustable relation the bearing sleeve 24, in which the longitudinal shaft 25, constituting the backbone of the fuselage is journalled.

The longitudinal adjustment of the fuselage relative to the supporting fork is effected in the illustration by a hand wheel 26, on the upper end of shaft 27, carrying at the lower end a bevel gear 28, meshing a bevel gear 29, on horizontally extending shaft 30, which has a portion 31, screwing into a nut block 32, fast on top of the casing 23, and which has a thrust mounting at 33, in the bracket or lug 34, fixed to the end of the bearing sleeve 24.

The bearing sleeve preferably has an antifriction mounting in the horizontally pivoted supporting box 23, and this may consist, as shown in Figs. 7, 8, and 9, of a cage structure 35, interposed between the flat bottom portion 36, of the bearing sleeve and the flat bottom of the supporting casing, said cage carrying the rollers 37.

With the construction described, it will be apparent that by turning the hand wheel 27, which may be located conveniently at the top or side of the fuselage, the entire fuselage structure may be shifted in a fore and aft direction, to balance it one way or the other, over the horizontal pivots 22, in the yoke.

The bearing sleeve 24, is sufficiently long and rigid to permit of such longitudinal balancing adjustments and the shaft may be supported therein by widely spaced bearings, such as the combination radial and thrust ball bearings indicated at 38, Fig. 7.

The center shaft 25 of the fuselage is shown as having head members 39, rigidly attached thereto, these forming the foundations or bases for carrying the motor and propeller mechanism at the front and the passenger compartment and other features at the rear.

It will be realized that a relatively slight bodily longitudinal adjustment will be sufficient for compensating considerable variations in passenger weight.

For lesser or finer adjustments, a compensating weight 40, may be slidably mounted on the projecting rear end of the shaft 25, and be shifted thereon as by means of hand wheel 41, on screw shaft 42, engaging a nut portion 43, on the weight, said screw shaft being journalled against endwise movement in bearings 44, supported by the main shaft 25. This balancing control 41, may be located in the cockpit, in reach of the passenger and in Fig. 1, it is indicated as also accessible from the outside through a door or hatchway 45, in the side of the fuselage.

The supporting post or column 20, is shown in Figs. 1 and 2 as rising from a suitable base or stand 46, utilized in the disclosure as a housing for the gasoline tank 47, and storage battery 48, for the engine. The gasoline may be pumped from this tank by one or more pumps 49, through a conduit 50, extending up through the column and the hollow stem of the yoke and having suitable flexible or swiveling conections therein. Similarly, the electrical connections 51, for starting and ignition purposes may be carried up through the hollow column and yoke stem and have suitable flexible or swivel devices interposed, allowing for the evolutions of the plane.

A ladder or stairway 52, is indicated leading up to the top of the stand and from this point access is had to the cockpit by a disappearing ladder or stair 53, which slides down into a guideway 54, in the stand and may be counterbalanced as by weight 55, and counterbalancing connections 56, so that an attendant can very readily shift the ladder up into and down out of the service positions. In the position of use, the ladder may be hooked on to the fuselage as indicated particularly in Fig. 3, where hooks 57, at the upper ends of the ladder are indicated as temporarily engaged in the eyes or loops 58, on the side of the fuselage. In this relation, one of the guard rails of the ladder at 59, serves as a stop for the cockpit door 60, thus aiding the passenger in entering or leaving the cockpit.

It is preferred to positively lock the fuselage when loading or unloading passengers and for this purpose there is shown in the illustration, Figs. 1, 2, and 4, a rectangular frame 61, hinged on the base or stand 62, and carrying C-shaped open hooks 63, at the upper end to engage over a bar 64, supported from struts 65, at the sides of the fuselage. The parts are shown so related that when the locking frame is swung up and the hooks 63, engaged with the fuselage bar 64, the frame will be tilted toward the closed side of the C-hooks, so that the parts cannot accidentally come unhooked. To release the fuselage, it is therefore necessary to positively shift the inclined frame 61, forwardly in Fig. 1, to detach the hooks from the fuselage bar. When thus unhooked, the locking frame may be lowered down onto the floor of the stand, entirely out of the way as indicated in broken lines in Fig. 1.

The control surfaces may be of suitable design and shape. In one simple form of the invention, such as illustrated in detail in Figs. 5 and 6, the wings are utilized also as ailerons by pivoting them at their forward edges on pipes or pivot rods 66, outstanding from the sides of the fuselage, said wings having bearing tubes 67, set in their forward edges, which will slide over these outstanding bearings. These bearing pipes 66, as indicated in Fig. 6, may be the end portions of a single pipe 66a, extending entirely across the fuselage and bent upwardly where they issue from the fuselage to afford a dihedral angle.

For rocking the wings to attain the desired aileron control, a stick 68, may be mounted in the cockpit to rock side wise on a pivotal support 69, and having laterally extending arms 70, connected by links 71, with levers 72, pivoted intermediate their ends at 73, and connected by pivot links 74, with the rearward or trailing edges of the wings at 75.

The control stick is shown in Fig. 6, as also pivoted at 76, for fore and aft movement and is suitably connected with the movable tail surfaces 13, for effecting the dipping and rising movements of the fuselage. The rudder 14, may be operated by a conventional rudder bar, not shown. An operator therefore by proper use of these controls may hold the plane on an even keel or may set up various movements, including the rolling or tilting on the longitudinal axis defined by the central supporting shaft 25, the pitching movements on the horizontal axis 22, and the swinging or yawing movements in a generally horizontal plane about the vertical axis 18. Abutment surfaces may be provided at 77, at the underside of the fuselage for limiting the tilting and pitching movements, these being shown as formed on generally circular lines for engagement with the head of the supporting column 20.

The "hitching" bar 64, extending across the underside of the fuselage and the bracket portions 65, of the same extending up the sides of the fuselage, serve as convenient handholds for an operator to use when engaging or disengaging the holding frame 61. The C-shaped hooks 63, allow a certain amount of freedom at this coupling, but the inclination of the frame toward the back or closed sides of the C-hooks prevent these from accidentally becoming disengaged.

The counterbalancing of the inclined step or ladder 53, enables this to be quickly raised and easily lowered and the placing of the guideway for this step or ladder in the stand, enables it to "disappear" entirely out of the way.

What is claimed is:

1. Aircraft training and amusement apparatus comprising a fuselage frame having a longitudinally extending supporting shaft section for mounting the fuselage, a bearing rotatably supporting said shaft section, a mounting in which said bearing is longitudinally shiftable, a vertically pivoted support in which said mounting is horizontally pivoted and means for longitudinally shifting said shaft bearing in said mounting to effect balancing adjustments of the fuselage frame.

2. Aircraft training apparatus comprising a vertically swiveled yoke, a casing horizontally pivoted in said yoke, a bearing shiftable longitudinally in said casing, a fuselage supporting shaft journaled in said bearing and a fuselage structure carried by said shaft and bodily shiftable therewith.

3. Aircraft training apparatus comprising a vertically swiveled yoke, a casing horizontally pivoted in said yoke, a bearing shiftable longitudinally in said casing, a fuselage supporting shaft journaled in said bearing, a fuselage structure carried by said shaft and bodily shiftable therewith and means for positively shifting the bearing in opposite directions.

4. Aircraft training apparatus comprising a vertically swiveled yoke, a casing horizontally pivoted in said yoke, a bearing shiftable longitudinally in said casing, a fuselage supporting shaft journaled in said bearing, a fuselage structure carried by said shaft and bodily shiftable therewith, said fuselage structure including motor and passenger sections carried by said shaft at opposite ends of said shiftable bearing, control means in the passenger section, movable control surfaces operable by said control means, a motor in the motor section and a propeller driven by said motor.

5. Aircraft training apparatus comprising a fuselage having a passenger compartment and control means therein, means for pivotally supporting said fuselage for movement in different directions responsive to said control means, means for longitudinally shifting said fuselage relative to said pivotal supporting means, a longitudinally shiftable weight means in the fuselage and means for shifting said weight means.

6. Aircraft training apparatus comprising a pivotally mounted fuselage having projecting tubing struts standing out from the sides of the same, wings pivoted on said projecting tubing and control means in said fuselage connected to tilt said wings in opposite directions to operate said wings as ailerons.

7. Aircraft training apparatus comprising a pivotally mounted fuselage having projecting tubing struts standing out from the sides of the same, wings pivoted on said projecting tubing, control means in said fuselage connected to tilt said wings in opposite directions to operate said wings as ailerons, said wings being pivoted at their forward edges and the control means being connected to raise and lower the trailing edges of the wings.

8. Aircraft training apparatus comprising a pivotally mounted fuselage having struts standing out from the sides of the same, wings pivotally hung on said struts, control means in said fuselage connected to tilt said wings in opposite directions to operate said wings as ailerons, said struts being projecting end portions of a length of tubing extending transversely through the fuselage.

9. Aircraft training apparatus comprising a fuselage supporting shaft, an elongated bearing for said shaft, a horizontally pivoted casing in which said bearing is longitudinally shiftable and a fuselage structure carried by said shaft and having motor and passenger carrying sections at the opposite ends of said shiftable bearing.

10. Aircraft training apparatus, comprising a fuselage shaft, an end head at the forward end of said fuselage shaft, a motor compartment carried by said forward end head, a rearward end head on said fuselage shaft, a passenger compartment carried by said rearward end head, a bearing for said fuselage shaft between said forward and rearward end heads and a horizontally pivoted casing in which said bearing is longitudinally shiftable.

HUGH JAMES MALLON.